April 19, 1938.  G. MAIURI  2,114,602
REFRIGERATING APPARATUS
Filed April 29, 1937
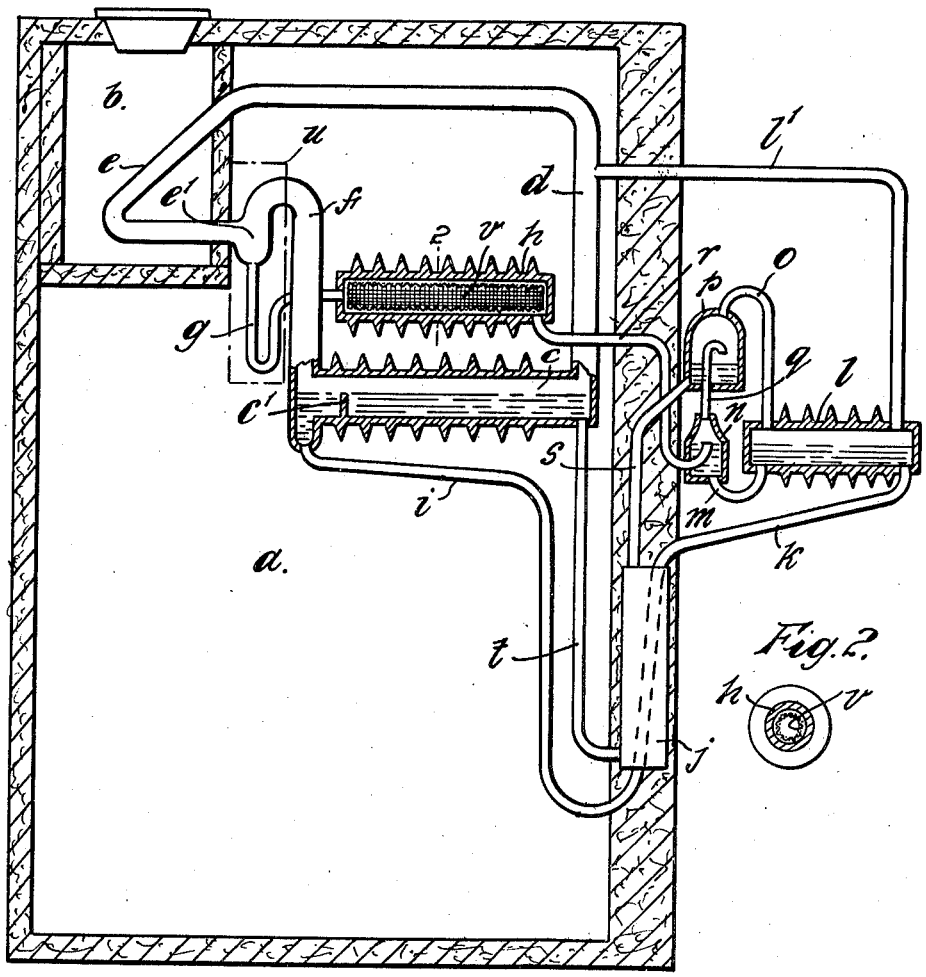
Inventor
GUIDO MAIURI
BY: Francis E. Boyce
ATTORNEY

Patented Apr. 19, 1938

2,114,602

UNITED STATES PATENT OFFICE 2,114,602

REFRIGERATING APPARATUS

Guido Maiuri, London, England

Application April 29, 1937, Serial No. 139,685
In Great Britain April 1, 1937

2 Claims. (Cl. 62—119.5)

This invention relates to an apparatus for effecting cooling at a considerably higher temperature than that of a source of cold at extremely low temperature. The apparatus is of the kind wherein a liquid refrigerant is evaporated, absorbed in a liquid absorbent and the heat of absorption is discarded externally, and again evaporated from the absorbent under a partial pressure into an inert gas, and is separated in liquid form from the inert gas by condensation by a source of extreme cold, such as solid carbon dioxide. The heat which is discarded in the form of heat of absorption is extracted from the space to be cooled and therefore represents an increase in the amount of the cold available for cooling such space over the amount of cold derived from the source of intense cold.

The above described kind of apparatus as hitherto constructed is difficult to start in operation, owing to the absorption liquor entering the evaporator for the liquid refrigerant, and by absorbing such refrigerant precluding or hindering the evaporation thereof.

The above defect is avoided, according to the present invention, by locating the evaporator for the liquid refrigerant at a higher level than the portions of the apparatus in which absorption liquor circulates. Thus even if the entire liquid media of the refrigerating apparatus become mixed by inversion of the apparatus, all liquor will readily drain from this evaporator and render the apparatus ready for service. Also any liability of absorption liquor accumulating in this evaporator and obstructing the action of the apparatus is eliminated.

An example of an apparatus of the above described kind and arranged according to the invention, is illustrated, somewhat diagrammatically, on the accompanying drawing, in which:—

Fig. 1 is a sectional elevation, and

Fig. 2 is a transverse section on the line 2—2 of Fig. 1.

$a$ is a refrigerating cabinet, and $b$ is a chamber heat-insulated from the cabinet $a$ and from the atmosphere and serving to contain dry ice, i. e. solid carbon dioxide.

The intense cold of the dry ice is unsuitable for directly cooling the cabinet $a$ to a moderate refrigeration temperature. Accordingly, an absorption apparatus without moving parts is provided which, in effect, converts the intense cold derived from the dry ice into a larger amount of moderate cold applied to the interior of the cabinet $a$.

This absorption apparatus has an evaporator $c$, wherein refrigerant vapour is evaporated under a partial pressure into an inert gas from absorption liquor. The evaporator $c$ is connected at one end by a pipe $d$ to the upper end of a condenser $e$ located in the dry ice chamber $b$, and at the other end by a pipe $f$ to the lower end of the condenser $e$. The cold of the dry ice sets up a convection action causing the gas to circulate down through the condenser $e$ and pipe $f$ through the evaporator $c$ and up the pipe $d$. The dry ice also condenses refrigerant vapour entrained by the gas.

The condensed refrigerant flows into a sump $e^1$ and thence by a U-shaped pipe $g$ into a second evaporator $h$.

The total pressure of the inert gas and thereby of the system is such that the liquid refrigerant in the second evaporator $h$ boils at the desired moderate refrigeration temperature which is thus the temperature at which the cabinet $a$ is maintained.

The liquor flows through the first evaporator $c$ in contra-flow with the inert gas, and a depth of liquor is maintained in the generator by a weir $c^1$.

The weakened absorption liquor leaves the evaporator $c$ by a pipe $i$ which leads downwards to one element of a heat-exchanger $j$, from which it is conducted upwards by a pipe $k$ to a chamber $l$ located outside the cabinet $a$ and adapted to discard heat to the atmosphere.

The chamber $l$ is connected at the bottom by a pipe $m$ to a chamber $n$ and on top by a pipe $o$ to a chamber $p$, both chambers being outside the cabinet $a$.

A pipe $q$ extends from the top of the chamber $n$, which extends at the same level as the chamber $l$, into and above the bottom of the chamber $p$ which is situated at a higher level.

A pipe $r$, connected to the bottom of the evaporator $h$, opens upwards in the chamber $n$ and discharges the refrigerant vapour from the evaporator $h$ upwards therein. The discharged vapour exerts a lifting action on liquor in the chamber $n$ thereby raising it up the pipe $q$ into the higher chamber $p$. Liquid refrigerant in the above mentioned U pipe $g$ prevents the refrigerant vapour passing back to the condenser $e$.

From the chamber $p$ the liquor descends a pipe $s$, connected thereto and to the other element of the heat-exchanger $j$, and ascends to the evaporator $c$ by a pipe $t$ interconnecting the latter and the heat-exchanger $j$.

Frictional opposition by the heat-exchanger $j$ to the flow of the liquor is overcome by the chamber $l$ and chamber $p$ being respectively below and above the level of the evaporator $c$.

The refrigerant vapour is intercepted by the upper chamber $p$ and flows therefrom by the pipe $o$ to the heat-discarding chamber $l$ wherein it becomes absorbed by the arriving weak liquor. In consequence it is rich liquor which flows along the pipe $m$ to replace liquor raised by the ejector pipe $r$ and rich liquor which is raised, so that the ejector action is not destroyed or materially reduced by absorption of the refrigerant vapour in the liquor.

$l^1$ is a pipe of small bore which interconnects the absorber chamber $l$ and the inert gas pipe $d$, so that when the apparatus is working all inert gas is driven out of the absorber and absorption occurs therein under the total pressure in the apparatus.

The sump $e^1$ and the U pipe $g$ should be heat-insulated, as indicated by dot-dash lines $u$, to avoid liquid refrigerant boiling before reaching the evaporator $h$.

In accordance with the present invention the evaporator $h$, wherein the liquid refrigerant evaporates, is located above any part of the apparatus wherein absorption liquor is normally present, and so dilution of the condensed refrigerant does not occur or readily becomes remedied.

The pipe $r$ is connected to and does not extend above the bottom of the evaporator $h$, in order to ensure that when the apparatus is put in place after transport, and in fact whenever the apparatus is not working the evaporator $h$ will be drained free of liquid. Any absorption liquor which may have become trapped in the U pipe $g$ owing to shaking or inversion during transport, will, when the apparatus starts operating, quickly become displaced by liquid refrigerant flowing down from the sump $e^1$ of the condenser $e$. The sump $e^1$ is sufficiently elevated that the limb of the U pipe $g$ connected therewith is of sufficient height for a column of liquid refrigerant to form therein of sufficient height to eject a column of liquor of greater density in the other limb.

To retain liquid refrigerant against the inner surface of the wall of the evaporator $h$ so as to evaporate thereon notwithstanding the drainage effected by the pipe $r$ being connected to the bottom of the evaporator $h$, the evaporator $h$ is lined with metal gauze $v$ which serves as a capillary lining to increase the evaporating and heat-transmitting surface. The absorber $l$ may similarly be lined with capillary gauze.

I claim:

1. In an apparatus for effecting cooling at a considerably higher temperature than that of a source of cold at extremely low temperature, an evaporator wherein a refrigerant evaporates from an absorbent liquid located in a space to be cooled, a condenser connected at one end to one end of said evaporator and at the other end to the other end of said evaporator and located in a space receiving a source of intense cold, said evaporator and absorber containing an inert gas, an absorber connected at one end to one end of said evaporator and at the other end to the other end of said evaporator and located outside the space to be cooled, a second evaporator connected to the lower end of said condenser and draining into said absorber and located in the space to be cooled above said first-mentioned evaporator and said absorber, and a capillary lining in said second evaporator.

2. In an apparatus for effecting cooling at a considerably higher temperature than that of a source of cold at extremely low temperature, an evaporator wherein a refrigerant evaporates from an absorbent liquid located in a space to be cooled, a condenser connected at one end to one end of said evaporator and at the other end to the other end of said evaporator and located in a space receiving a source of intense cold, said evaporator and absorber containing an inert gas, an absorber connected at one end to one end of said evaporator and at the other end to the other end of said evaporator and located outside the space to be cooled, a second evaporator draining into said absorber and located in the space to be cooled above said first-mentioned evaporator and said absorber, a capillary lining in said second evaporator and a U pipe connected by a longer limb to the lower end of said condenser and by a shorter limb to said second evaporator.

GUIDO MAIURI.